(12) United States Patent
Ishino

(10) Patent No.: US 10,118,445 B2
(45) Date of Patent: Nov. 6, 2018

(54) PNEUMATIC TIRE

(71) Applicant: Sumitomo Rubber Industries, Ltd., Kobe-shi, Hyogo (JP)

(72) Inventor: Hiroyuki Ishino, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 40 days.

(21) Appl. No.: 15/074,718

(22) Filed: Mar. 18, 2016

(65) Prior Publication Data

US 2016/0297249 A1 Oct. 13, 2016

(30) Foreign Application Priority Data

Apr. 9, 2015 (JP) .................................. 2015-079776

(51) Int. Cl.
| | | |
|---|---|---|
| *B60C 11/03* | (2006.01) | |
| *B60C 11/12* | (2006.01) | |
| *B60C 11/11* | (2006.01) | |
| *B60C 11/13* | (2006.01) | |

(52) U.S. Cl.
CPC ...... *B60C 11/0327* (2013.01); *B60C 11/0302* (2013.01); *B60C 11/0306* (2013.01); *B60C 11/11* (2013.01); *B60C 11/1236* (2013.01); *B60C 11/1315* (2013.01); *B60C 2011/0334* (2013.01); *B60C 2011/0339* (2013.01);
(Continued)

(58) Field of Classification Search
CPC ............. B60C 11/0327; B60C 11/1236; B60C 11/0302; B60C 11/0306; B60C 11/11
See application file for complete search history.

(56) References Cited

U.S. PATENT DOCUMENTS

| | | | | | |
|---|---|---|---|---|---|
| D716,720 | S | * | 11/2014 | Seng | D12/563 |
| D721,323 | S | * | 1/2015 | Caron | D12/563 |
| D722,555 | S | * | 2/2015 | Knispel | D12/564 |

(Continued)

FOREIGN PATENT DOCUMENTS

| | | | | |
|---|---|---|---|---|
| DE | 102011055915 A1 | * | 6/2013 | B60C 11/0302 |
| DE | 102011055915 A1 | | 6/2013 | |

(Continued)

OTHER PUBLICATIONS

Extended European Search Report for European Application No. 16161302.1, dated Sep. 7, 2016.

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

A pneumatic tire includes a tread portion being provided with a plurality of inclined main grooves extending beyond a tire equator from one of a first tread edge and a second tread edge and terminating without reaching the other one of the first tread edge and the second tread edge. Each of the inclined main grooves includes an outer portion and an inner portion. The outer portion extends from the first tread edge or the second tread edge without reaching the tire equator while increasing an angle relative to an axial direction of the tire. The inner portion is connected to the outer portion and traverses the tire equator at a smaller angle relative to the axial direction of the tire than the angle of the outer portion.

12 Claims, 4 Drawing Sheets

(52) U.S. Cl.
　　　CPC ................ *B60C 2011/0374* (2013.01); *B60C 2011/0381* (2013.01)

(56) References Cited

U.S. PATENT DOCUMENTS

| | | |
|---|---|---|
| 2009/0199943 A1 | 8/2009 | Boiocchi et al. |
| 2012/0216929 A1* | 8/2012 | Matsunami ......... B60C 11/0302 152/209.11 |

FOREIGN PATENT DOCUMENTS

| | | | |
|---|---|---|---|
| JP | 6-16016 A | | 1/1994 |
| JP | 06016016 A | * | 1/1994 |
| JP | 2002-248909 A | | 9/2002 |
| WO | WO 2014/115052 A1 | | 7/2014 |
| WO | WO 2014115052 A1 | * | 7/2014 ......... B60C 11/0302 |

* cited by examiner

PNEUMATIC TIRE

BACKGROUND ART

Field of the Invention

The present invention relates to pneumatic tires, and in particular relates to a pneumatic tire that may improve steering stability on dry, wet grip performance and on-snow performance in good balance.

Description of the Related Art

For instance, Japanese Unexamined Patent Application Publication No. H06-16016 discloses a pneumatic tire for winter that includes a tread portion provided with a plurality of inclined main grooves extending from a tread edge toward the tire equator.

Unfortunately, such a pneumatic tire still has room for improvement in view of steering stability on dry condition, wet grip performance and on-snow performance.

SUMMARY OF THE INVENTION

In view of the above problems in the conventional art, the present invention has an object to provide a pneumatic tire capable of improving steering stability on dry, wet grip performance and on-snow performance in good balance.

According to one aspect of the invention, a pneumatic tire includes a tread portion being provided with a plurality of inclined main grooves extending beyond a tire equator from one of a first tread edge and a second tread edge and terminating without reaching the other one of the first tread edge and the second tread edge. Each of the inclined main grooves includes an outer portion and an inner portion. The outer portion extends from the first tread edge or the second tread edge without reaching the tire equator while increasing an angle relative to an axial direction of the tire. The inner portion is connected to the outer portion and traverses the tire equator at a smaller angle relative to the axial direction of the tire than the angle of the outer portion.

In another aspect of the invention, the inclined main grooves may include a plurality of first inclined main grooves extending from the first tread edge, and a plurality of second inclined main grooves extending from the second tread edge, wherein the inner portions of the first inclined main grooves are communicated with the outer portions of the second inclined main grooves, and the inner portions of the second inclined main grooves are communicated with the outer portions of the first inclined main grooves.

In another aspect of the invention, the inner portion may include a width increasing gradually toward the outer portion.

In another aspect of the invention, the tread portion may include a plurality of inclined land portions each of which is disposed between a pair of circumferentially adjacent inclined main grooves. Each of the inclined land portions may be provided with a longitudinal groove to separate the inclined land portion into an axially inner block and an axially outer block, wherein the inner block is provided with a plurality of inner sipes inclined in an opposite direction to the inclined main grooves adjacent to the inner block, and the outer block is provided with a plurality of outer sipes inclined in the same direction as the first inclined main grooves adjacent to the outer block.

In another aspect of the invention, the inner block may be provided with a lug groove that comprises a first end communicated with one of the inclined main grooves and a second end terminating within the inner block.

In another aspect of the invention, the inclined main grooves may include a plurality of first inclined main grooves extending from the first tread edge, and a plurality of second inclined main grooves extending from the second tread edge, wherein the inner portions of the first inclined main grooves are communicated with the outer portions of the second inclined main grooves, and the inner portions of the second inclined main grooves are communicated with the outer portions of the first inclined main grooves. The lug groove may include a first lug groove that is smoothly continuous to the inner portion of one of the second inclined main grooves through one of the first inclined main grooves, and a second lug groove that is smoothly continuous to the inner portion of one of the first inclined main grooves through one of the second inclined main grooves.

In another aspect of the invention, the inner block may include a protruding portion in an axial direction of the tire between the inner portion of one of the first inclined main grooves and the inner portion of one of the second inclined main grooves.

In another aspect of the invention, the inner block may have a tapered shape.

In another aspect of the invention, the outer portion may extend in an arc shape and the inner portion extends in a substantially straight shape.

In another aspect of the invention, the inner portions of the first inclined main grooves may be inclined in an opposite direction to the inner portions of the second inclined main grooves.

In another aspect of the invention, the first inclined main grooves and the second inclined main grooves may be arranged alternately in a circumferential direction of the tire.

In another aspect of the invention, the tread portion may be not provided with any circumferentially and continuously extending straight grooves.

DESCRIPTION OF THE PREFERRED EMBODIMENTS

An embodiment of the present invention will be explained below with reference to the accompanying drawings.

Figure 1:
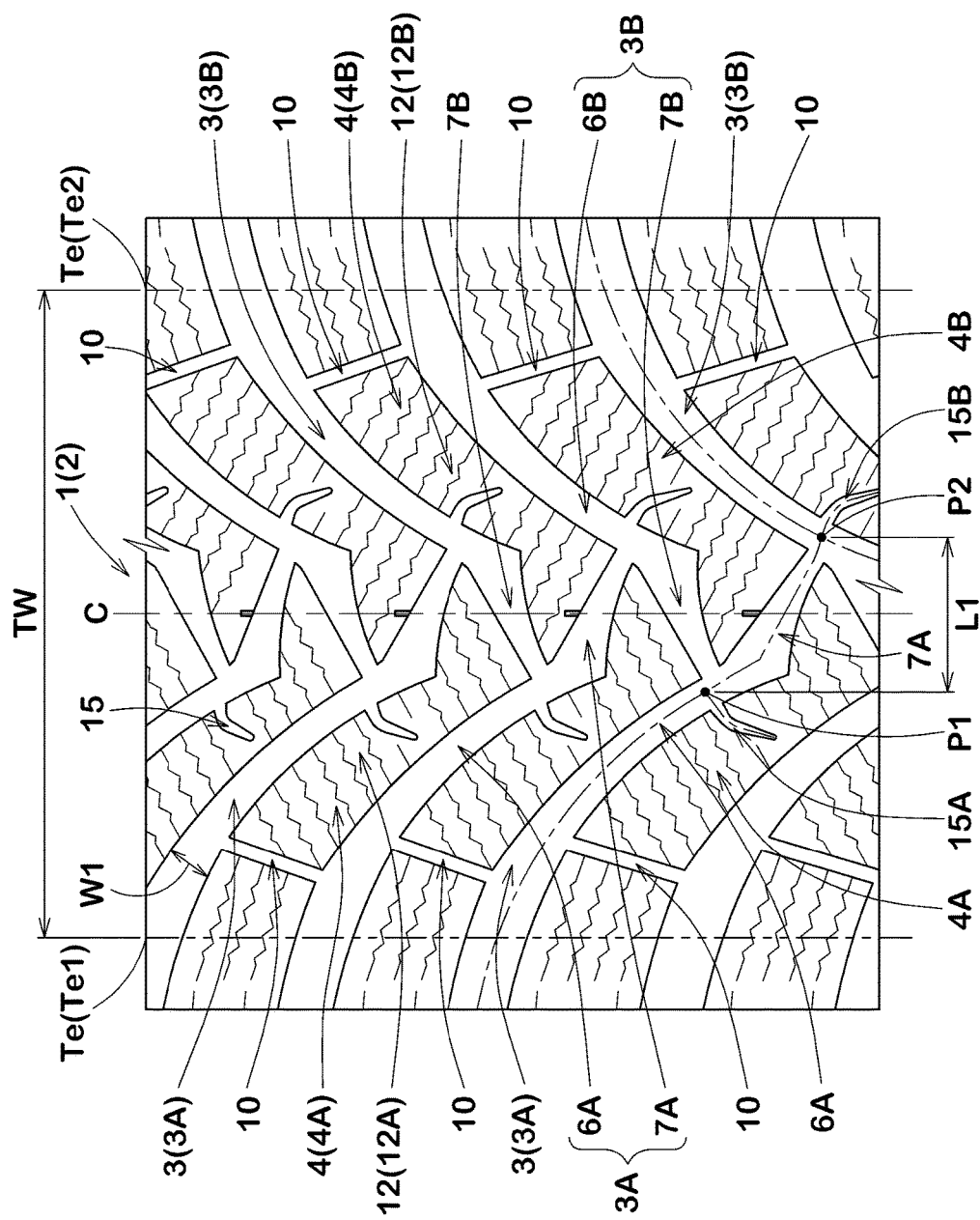
FIG. 1 is a development view of a tread portion of a pneumatic tire according to an embodiment of the present invention.

FIG. 1 illustrates a development view of a tread portion 2 of a pneumatic tire 1 according to an embodiment of the present invention. The pneumatic tire 1 according to the present embodiment may preferably be embodied as a winter tire for passenger cars.

As illustrated in FIG. 1, the tread portion 2 of the tire 1 according to the present embodiment is not provided with any circumferentially and continuously extending straight grooves. On the other hand, the tread portion 2 is provided with a plurality of inclined main grooves 3 and a plurality of inclined land portions 4 each of which is separated between a pair of circumferentially adjacent inclined main grooves 3.

The inclined main grooves 3 extend beyond the tire equator C from one of tread edges Te and terminate without reaching the other one of the tread edges Te.

As used herein, the tread edges Te refer to axially outermost edges of the ground contacting patch of the tread portion 2 which occurs under a normally inflated loaded condition when the camber angle of the tire 1 is zero. The normally inflated loaded condition is such that the tire 1 is mounted on a standard wheel rim with a standard pressure, and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard tire load is the "maximum load capacity" in JATMA, the "Load Capacity" in ETRTO, and the maximum value given in the above-mentioned table in TRA or the like.

Unless otherwise noted, dimensions of respective portions of the tire are values specified in a normally inflated unloaded condition such that the tire 1 is mounted on the standard wheel rim with the standard pressure, but is loaded with no tire load.

The inclined main grooves 3 may increase traction on snow by shearing snow compressed therein firmly while offering an excellent drainage performance. Thus, the pneumatic tire 1 in accordance with the present embodiment may offer an excellent on-snow performance.

In order to further improve on-snow performance and wet grip performance in good balance, widths W1 of the inclined main grooves 3 are preferably in a range of from 6.0 to 15.0 mm, more preferably in a range of from 8.5 to 12.5 mm. In the same point of view, depths of the inclined main grooves 3 are preferably in a range of from 6.0 to 12.0 mm, more preferably in a range of from 8.4 to 9.4 mm.

The inclined main grooves 3, for example, include a plurality of first inclined main grooves 3A and a plurality of second inclined main grooves 3B. The first inclined main grooves 3A extend from a first tread edge Te1 (the left side tread edge in FIG. 1). The second inclined main grooves 3B extend from a second tread edge Te2 (the right side tread edge in FIG. 1). In this embodiment, the first inclined main grooves 3A and the second inclined main grooves 3B are substantially formed in a line symmetrical shape with respect to the tire equator C. That is, the first inclined main grooves 3A are inclined in an opposite direction to the second inclined main grooves 3B. Furthermore, the first inclined main grooves 3A and the second inclined main grooves 3B are spaced and arranged alternately in the circumferential direction of the tire.

Figure 2:
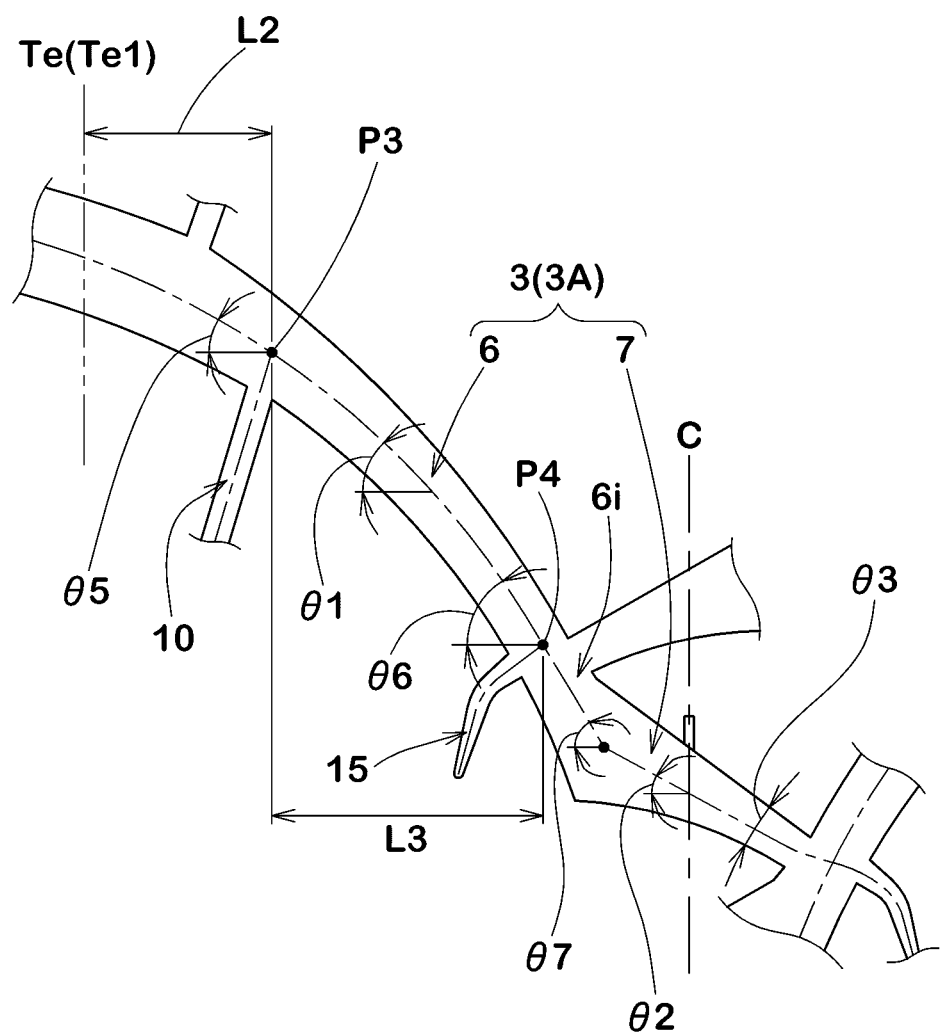
FIG. 2 is an enlarged view illustrating a groove outline of a first inclined main groove of FIG. 1.

FIG. 2 illustrates an enlarged view of a groove outline of one of the first inclined main grooves 3A of FIG. 1, as a representative of the inclined main grooves 3. As illustrated in FIG. 2, the inclined main groove 3 includes an outer portion 6 and an inner portion 7.

The outer portion 6 extends from one of the tread edges Te without reaching the tire equator C while increasing an angle $\theta 1$ relative to the axial direction of the tire. In this embodiment, the outer portion 6 extends in an arc shape, for example. The angle $\theta 1$ of the outer portion 6, for example, is in a range of from 15 to 65 degrees. As used herein, an angle of a groove is defined using a groove centerline. The detail of the angle of the outer portion 6 will be described later.

Thus, the tire 1 of the embodiment may suppress generation of a thick water film around the tire equator C between the tread portion 2 and the road, thereby preventing hydroplaning phenomenon at high speed ranges.

In order to further improve the advantageous effect above, the outer portion 6 preferably has a width increasing toward the tread edge Te.

The inner portion 7 is connected to the outer portion 6 on the side of the tire equator C. The inner portion 7 traverses the tire equator C at a smaller angle relative to the axial direction of the tire than the angle of the outer portion 6. Such an inner portion 7 may ensure sufficient lateral rigidity of the tread portion around the tire equator C on which a large ground contact pressure is acted. Accordingly, the tire in accordance with the present embodiment may generate large cornering force to improve steering stability on dry conditions.

In order to further improve the advantageous effect above, the angle $\theta 2$ of the inner portion 7 relative to the axial direction of the tire is preferably in a range of not less than 15 degrees, more preferably not less than 18 degrees, but preferably in a range of not more than 25 degree, more preferably not more than 22 degrees.

Preferably, the inner portion 7 has a width increasing gradually toward the outer portion 6. Such an inner portion 7 may have a benefit to improve wet grip performance. Preferably, the angle $\theta 3$ between groove edges of the inner portion 7 is in a range of from 14 to 24 degrees, for example. In this embodiment, the inner portion is formed as a substantially straight shape, for example.

As illustrated in FIG. 1, each of the inner portions 7A of the first inclined main grooves 3A is communicated with each of the outer portions 6B of the second inclined main grooves 3B, for example. Furthermore, each of the inner portions 7B of the second inclined main grooves 3B is communicated with each of the outer portions 6A of the first inclined main grooves 3A, for example. Thus, when traveling on snow, a large snow column can be formed at the respective groove junctions, thereby improving on-snow performance.

Furthermore, each of the inclined land portions 4 is separated between a pair of circumferentially adjacent inclined main grooves 3 and 3, for example. In this embodiment, the inclined land portions 4 include a first inclined land portion 4A disposed between a pair of circumferentially adjacent first inclined main grooves 3A and 3A, and a second inclined land portion 4B disposed between a pair of circumferentially adjacent second inclined main grooves 3B and 3B.

Figure 3:
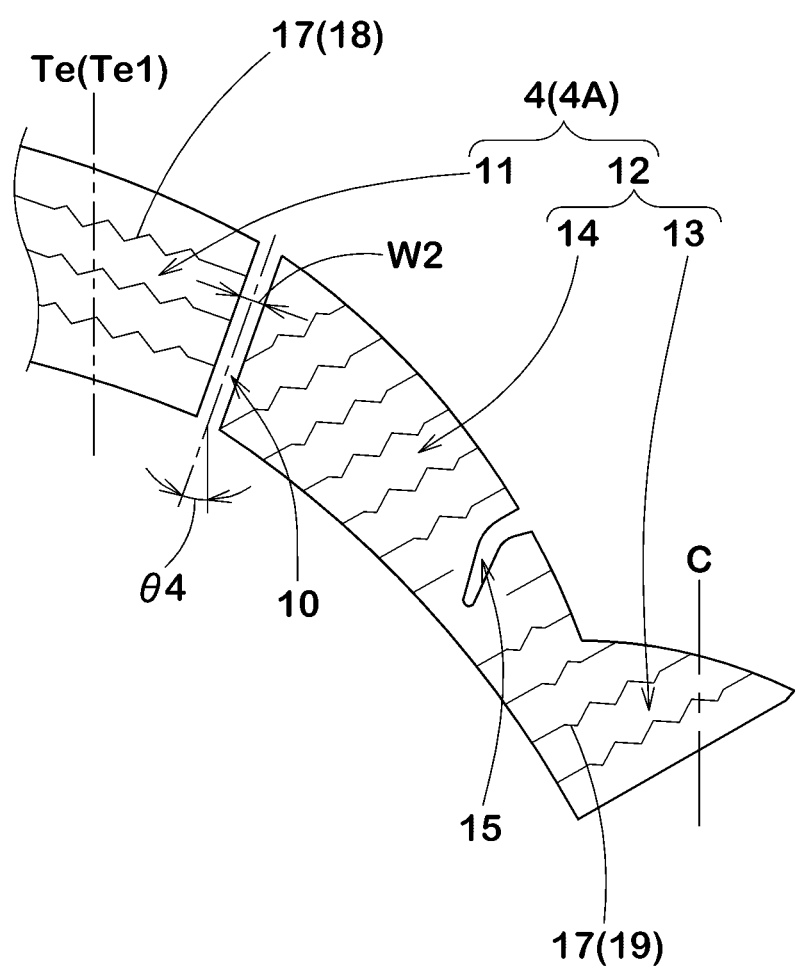
FIG. 3 is an enlarged view of a first inclined land portion of FIG. 1.

FIG. 3 illustrates an enlarged view of the first inclined land portion 4A of FIG. 1, as a representative of the inclined land portions 4. As illustrated in FIG. 3, the inclined land portion 4 is provided with a longitudinal groove 10 to separate the inclined land portion 4 into an axially inner block 12 and an axially outer block 11.

The longitudinal groove 10, for example, is inclined at an angle $\theta 4$ in an opposite direction to the inclined main grooves 3 to which the longitudinal groove 10 is connected.

The angle θ4 of the longitudinal groove 10, for example, is in a range of from 10 to 20 degrees relative to the circumferential direction of the tire.

In this embodiment, the longitudinal groove 10, for example, extends in a straight shape. Alternatively, the longitudinal groove 10 may extend in a zigzag or wavy shape.

Preferably, the width W2 of the longitudinal groove 10, for example, is smaller than the widths W1 of the inclined main grooves 3. More preferably, the width W2 of the longitudinal groove 10 is in a range of from 3.0 to 5.0 mm. Such a longitudinal groove 10 may improve steering stability on dry conditions and wet grip performance in good balance.

As illustrated in FIG. 1, since the respective longitudinal grooves 10 are inclined relative to the circumferential direction, the longitudinal grooves 10 do not form a single circumferential straight groove through the inclined main grooves 3.

As illustrated in FIG. 3, the outer block 11 is defined between the longitudinal groove 10 and the tread edge Te. The outer block 11, for example, may offer a trapezoidal ground contact surface.

The inner block 12, for example, is arranged axially inward of the longitudinal groove 10. As illustrated in FIG. 1, the inner block 12A of the first inclined land portion 4A is defined among a pair of circumferentially adjacent first inclined main grooves 3A and 3A, the longitudinal groove 10 and the inner portion 7B of one of the second inclined main grooves 3B. The inner block 12B of the second inclined land portion 4B is defined among a pair of circumferentially adjacent second inclined main grooves 3B and 3B, the longitudinal groove 10 and the inner portion 7A of one of the first inclined main grooves 3A.

As illustrated in FIGS. 1 and 3, the inner block 12, for example, includes a first block piece 13 and a second block piece 14 to form a boot shape.

The first block piece 13, for example, is disposed between the inner portion 7A of the first inclined main groove 3A and the inner portion 7B of the second inclined main groove 3B, as illustrated in FIG. 1.

The first block piece 13 is formed as a protruding portion in the axial direction of the tire (toward the right side in FIG. 3). In this embodiment, the protruding portion has a tapered shape, for example. Since such a first block piece 13 may deform flexibly during traveling on snow, a self cleaning feature of the tire where snow clogged in grooves is removed therefrom easily can be improved.

The second block piece 14 is located axially outward of the first block piece 13, and is defined among a pair of circumferentially adjacent outer portions 6 and 6 (illustrated in FIG. 1) and the longitudinal groove 10.

In this embodiment, the second block piece 14, for example, is provided with a lug groove 15. The lug groove 15, for example, includes a first end communicated with one of the inclined main grooves 3 and a second end terminating within the second block piece 14 of the inner block 12. Preferably, the lug groove 15 may be formed as a bent shape. The lug groove 15 may be useful to improve wet grip performance and on-snow performance of the tire in good balance.

As illustrated in FIG. 1, the lug groove 15, for example, includes a first lug groove 15A provided on the first inclined land portions 4A and a second lug groove 15B provided on the second inclined land portions 4B.

Preferably, the first lug groove 15A is disposed such that the first lug groove 15A is continuous smoothly to the inner portion 7B of one of the second inclined main grooves 3B through one of the first inclined main grooves 3A. Preferably, the second lug groove 15B is disposed such that the second lug groove 15B is continuous smoothly to the inner portion 7A of one of the first inclined main grooves 3A through one of the second inclined main grooves 3B. With this, when traveling on snow, the first lug groove 15A and the second lug groove 15B may compress snow so as to form a long snow column in cooperate with the continuous inclined main grooves 3 to increase traction.

Preferably, an axial length L1 between groove junctions P1 and P2 is in a range of from 0.15 to 0.25 times of the tread width TW. Here, the tread width TW is defined as an axial distance between tread edges Te and Te. The groove junction P1 is defined, using groove centerlines, as a junction between the first lug groove 15A and the inclined main groove 3 to which the first lug groove 15A is connected. The groove junction P2 is defined, using groove centerlines, as a junction between the second lug groove 15B and the second inclined main groove 3B to which the second lug groove 15B is connected. This configuration may ensure sufficient rubber volume around the tire equator C so that steering stability on dry conditions and on-snow performance can be improved in good balance.

As illustrated in FIG. 3, the outer block 11 and the inner block 12 in accordance with the present embodiment are provided with a plurality of sipes 17. The sipes 17 may improve on-snow performance of the tire. As used herein, a sipe means a narrow cut having a width of not more than 1.5 mm.

The outer block 11 is provided with a plurality of outer sipes 18 which are inclined in the same direction as the inclined main grooves 3 adjacent to the outer block 11. This configuration may be useful to improve wandering performance by lowering rigidity of the outer block 11.

The inner block 12 is provided with a plurality of inner sipes 19 which are inclined in an opposite direction to the inclined main grooves adjacent to the inner block 12. The inner block 12 may offer edge effect of sipes in various directions to increase friction on ice and compressed snow.

In a preferred embodiment, the outer sipe 18 and the inner sipe 19 are formed as a zigzag shape at least partially. This configuration may ensure sufficient block rigidity by engaging a pair of facing surfaces of each sipe one another. Alternatively, the sipes 18 and 19 may be formed as a straight or wavy shape.

As illustrated in FIG. 2, at the groove junction P3 where the groove centerline of the outer portion 6 intersects with the extension of the groove centerline of the longitudinal groove 10, the angle θ5 of the outer portion 6 is preferably in a range of from 25 to 35 degrees relative to the axial direction of the tire, in order to further improve wet grip performance and wandering performance on snow.

In order to further improve the advantageous effect above, an axial distance from the tread edge Te to the groove junction P3 is preferably in a range of from 0.19 to 0.24 times of the tread width TW.

At the groove junction P4 where the groove centerline of the outer portion 6 intersects with the extension of the groove centerline of the lug groove 15, the angle θ6 of the outer portion 6 is preferably in a range of from 44 to 52 degrees relative to the axial direction of the tire, in order to further improve wet grip performance of the tire.

Preferably, an axial distance L3 between groove junctions P3 and P4 is in a range of from 0.16 to 0.20 times of the tread width TW. Since this configuration may offer a sufficient distance between the longitudinal groove 10 and the lug groove 15, wet grip performance of the tire can further be improved while ensuring tread rigidity.

At the axially inner end 6i of the outer portion 6, the angle θ7 of the outer portion 6 is preferably in a range of from 55 to 65 degrees relative to the axial direction of the tire, in order to further improve wet grip performance by draining water around the tire equator C to the tread edge Te.

While the embodiments in accordance with the present invention have been described in detail, the present invention is not limited to the illustrated embodiments, but can be modified and carried out in various aspects.

Example

Pneumatic tires having a basic tread pattern illustrated in FIG. 1 and a size of 195/65R15 were manufactured based on details shown in Table 1, and then steering stability on dry conditions, wet grip performance and on-snow performance were tested. As for a comparative reference tire, the tire having a tread pattern illustrated in FIG. 4 was also manufactured. The inclined main grooves of the comparative reference tire are inclined at angles increasing gradually relative to the axial direction of the tire from one of the tread edges to its axially inner ends. The common specifications of tires and test procedures are as follows.

Rim: 15×6.0

Tire inner pressure: 200 kPa

Test vehicle: FF with 2000 cc displacement engine

Tire installing location: All wheels

Steering Stability on Dry Test:

A test driver drove the test vehicle on a dry asphalt oval test course for ten laps, and evaluated the steering stability by his feeling. The results are indicated in Table 1 using a score of Ref. 1 being 100. The larger the value, the better the performance is.

Wet Grip Performance Test:

The test vehicle was run along a 100 meter radius circle on an asphalt road partially provided with a 5 mm-depth and 20 m-long water pool, and the lateral acceleration (lateral G) during running in the water pool was measured at the front wheels, gradually increasing the speed entering into the water pool, to obtain the average lateral acceleration for the speed range of from 50 to 80 km/h. The results are indicated in Table 1 by an index based on Ref. 1 being 100, wherein the larger is better.

On-Snow Performance Test:

A test driver drove the test vehicle on a compressed snow road, and the distance required for accelerating the test vehicle from 5 km/hr to 20 km/hr was measured. The results are indicated in Table 1 using a score of Ref. 1 being 100. The smaller the value, the better the performance is.

The test results are shown in Table 1.

TABLE 1

Figure 4:
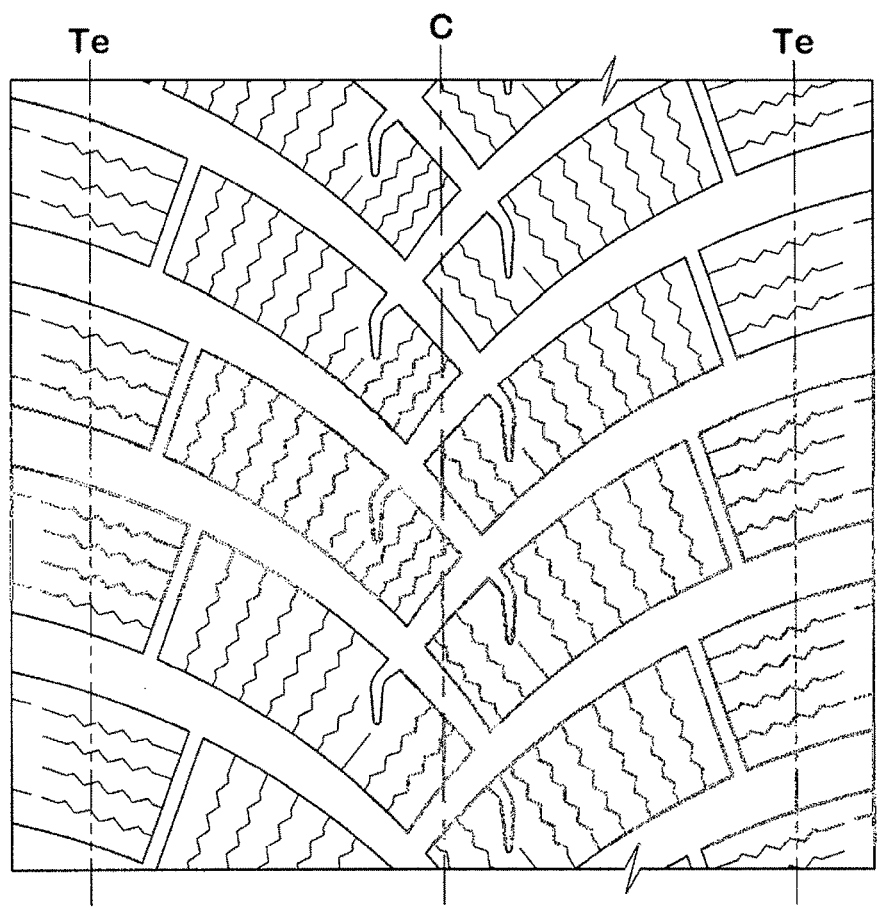
FIG. 4 is a development view of a tread portion of a pneumatic tire according to a comparative example.

|  | Ref | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Tread pattern | FIG. 4 | FIG. 1 | FIG. 1 | FIG. 1 | FIG. 1 | FIG. 1 | FIG. 1 | FIG. 1 | FIG. 1 |
| Outer portion angle θ5 at groove junction P3 (deg.) | 23 | 30 | 20 | 25 | 35 | 40 | 25 | 30 | 30 |
| Outer portion angle θ6 at groove junction P4 (deg.) | 45 | 48 | 48 | 48 | 48 | 48 | 44 | 52 | 44 |
| Outer portion angle θ7 at inner end (deg.) | — | 60 | 60 | 60 | 60 | 60 | 60 | 64 | 60 |
| Inner portion angle θ2 (deg.) | — | 20 | 20 | 20 | 20 | 20 | 20 | 20 | 20 |
| Steering stability on dry conditions (Score) | 100 | 106 | 107 | 106 | 105 | 103 | 106 | 104 | 106 |
| Wet grip performance (Index) | 100 | 104 | 101 | 102 | 104 | 105 | 101 | 106 | 102 |
| On-snow performance (Index) | 100 | 93 | 93 | 93 | 94 | 94 | 95 | 94 | 93 |
|  | Ex. 9 | Ex. 10 | Ex. 11 | Ex. 12 | Ex. 13 | Ex. 14 | Ex. 15 | Ex. 16 | Ex. 17 |
| Tread pattern | FIG. 1 | FIG. 1 | FIG. 1 | FIG. 1 | FIG. 1 | FIG. 1 | FIG. 1 | FIG. 1 | FIG. 1 |
| Outer portion angle θ5 at groove junction P3 (deg.) | 30 | 30 | 30 | 30 | 30 | 30 | 30 | 30 | 30 |
| Outer portion angle θ6 at groove junction P4 (deg.) | 52 | 48 | 48 | 48 | 48 | 48 | 48 | 48 | 48 |
| Outer portion angle θ7 at inner end (deg.) | 60 | 50 | 55 | 65 | 70 | 60 | 60 | 60 | 60 |
| Inner portion angle θ2 (deg.) | 20 | 20 | 20 | 20 | 20 | 15 | 18 | 22 | 25 |
| Steering stability on dry conditions (Score) | 105 | 106 | 106 | 104 | 103 | 106 | 106 | 105 | 104 |
| Wet grip performance (Index) | 104 | 102 | 103 | 104 | 105 | 102 | 103 | 104 | 104 |
| On-snow performance (Index) | 94 | 93 | 93 | 94 | 95 | 94 | 93 | 93 | 94 |

From the test results, it is confirmed that the example tires improve steering stability on dry, wet grip performance and on-snow performance in good balance, as compared with the reference tire.

What is claimed is:

1. A pneumatic tire comprising:
a tread portion being provided with a plurality of inclined main grooves extending beyond a tire equator from one of a first tread edge and a second tread edge and terminating without reaching the other one of the first tread edge and the second tread edge, wherein the inclined main grooves comprise a plurality of first inclined main grooves extending from the first tread edge and a plurality of second inclined main grooves extending from the second tread edge;
each of the inclined main grooves comprising an outer portion and an inner portion, wherein the inner portions of the first inclined main grooves are communicated with the outer portions of the second inclined main grooves at connecting portions of the inner portions and the outer portions of the second inclined main grooves, the inner portions of the second inclined main grooves are communicated with the outer portions of the first inclined main grooves at connecting portions of the inner portions and the outer portions of the first inclined main grooves, and angles relative to the axial direction of the tire of the inclined main grooves gradually increase from the first tread edge or the second tread edge toward the tire equator and stop increasing at the connecting portions; the outer portion extending from the first tread edge or the second tread edge without reaching the tire equator while increasing an angle relative to an axial direction of the tire; the inner portion being connected to the outer portion and traversing the tire equator at a smaller angle relative to the axial direction of the tire than the angle of the outer portion; and the inner portion comprising a width increasing gradually toward the outer portion;

wherein the tread portion comprises a plurality of inclined land portions each of which is disposed between a pair of circumferentially adjacent inclined main grooves, each of the inclined land portions being provided with a longitudinal groove to separate the inclined land portion into an axially inner block and an axially outer block, wherein the inner block is provided with a lug groove that comprises a first end communicated with one of the inclined main grooves and a second end terminating within the inner block, wherein the inclined main grooves comprise a plurality of first inclined main grooves extending from the first tread edge, and a plurality of second inclined main grooves extending from the second tread edge, the inner portions of the first inclined main grooves being communicated with the outer portions of the second inclined main grooves, the inner portions of the second inclined main grooves being communicated with the outer portions of the first inclined main grooves; and wherein the lug groove comprises a first lug groove that is smoothly continuous to the inner portion of one of the second inclined main grooves through one of the first inclined main grooves and a second lug groove that is smoothly continuous to the inner portion of one of the first inclined main grooves through one of the second inclined main grooves.

2. The pneumatic tire according to claim 1, wherein the width of the inner portion increases gradually towards the outer portion from an end thereof opposite to the outer portion.

3. The pneumatic tire according to claim 1, wherein
the inner block is provided with a plurality of inner sipes inclined in an opposite direction to the inclined main grooves adjacent to the inner block, and
the outer block is provided with a plurality of outer sipes inclined in the same direction as the first inclined main grooves adjacent to the outer block.

4. The pneumatic tire according to claim 1,
wherein the inner block comprises a protruding portion in an axial direction of the tire between the inner portion of one of the first inclined main grooves and the inner portion of one of the second inclined main grooves.

5. The pneumatic tire according to claim 4,
wherein the inner block has a tapered shape.

6. The pneumatic tire according to claim 1,
wherein the outer portion extends in an arc shape and the inner portion extends in a substantially straight shape.

7. The pneumatic tire according to claim 1,
wherein the inner portions of the first inclined main grooves are inclined in an opposite direction to the inner portions of the second inclined main grooves.

8. The pneumatic tire according to claim 1,
wherein the first inclined main grooves and the second inclined main grooves are arranged alternately in a circumferential direction of the tire.

9. The pneumatic tire according to claim 1,
wherein the tread portion is not provided with any circumferentially and continuously extending straight grooves.

10. The pneumatic tire according to claim 1,
wherein the outer portion comprises a width decreasing gradually towards the connecting portion and increases at the connecting portion.

11. The pneumatic tire according to claim 4,
wherein the protruding portion is directly sandwiched by the inner portions of a pair of one of the first inclined main grooves and one of the second inclined main grooves adjacent to each other.

12. The pneumatic tire according to claim 1,
wherein the inner portions of the first inclined main grooves and the second inclined main grooves are directly connected alternately so as to form a zigzag shape extending in the tire circumferential direction.

* * * * *